US012012086B2

(12) United States Patent
Cha (10) Patent No.: US 12,012,086 B2
(45) Date of Patent: Jun. 18, 2024

(54) APPARATUS, METHOD, AND COMPUTER READABLE STORAGE MEDIUM FOR TUNING BREAK CURVE BASED ON MACHINE LEARNING

(71) Applicants: HYUNDAI MOTOR COMPANY, Seoul (KR); KIA CORPORATION, Seoul (KR)

(72) Inventor: Ho Hyun Cha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 245 days.

(21) Appl. No.: 17/743,113

(22) Filed: May 12, 2022

(65) Prior Publication Data
US 2023/0166698 A1 Jun. 1, 2023

(30) Foreign Application Priority Data
Nov. 30, 2021 (KR) .......................... 10-2021-0169183

(51) Int. Cl.
*B60T 7/06* (2006.01)
*B60W 10/18* (2012.01)
*B60W 40/09* (2012.01)
*G06N 3/08* (2023.01)

(52) U.S. Cl.
CPC .............. *B60T 7/06* (2013.01); *B60W 10/18* (2013.01); *B60W 40/09* (2013.01); *G06N 3/08* (2013.01); *B60T 2220/02* (2013.01); *B60W 2540/12* (2013.01); *B60W 2540/30* (2013.01); *B60W 2556/10* (2020.02)

(58) Field of Classification Search
CPC ..... B60W 10/18; B60W 10/124; B60T 8/171; B60T 8/172; B60T 8/321
See application file for complete search history.

(56) References Cited

U.S. PATENT DOCUMENTS

| | | | |
|---|---|---|---|
| 2006/0109094 A1* | 5/2006 | Prakah-Asante | B60Q 9/008 340/439 |
| 2009/0234552 A1* | 9/2009 | Takeda | G08G 1/167 701/1 |
| 2013/0187442 A1 | 7/2013 | Kong | |
| 2014/0067220 A1* | 3/2014 | Seiler | B60T 7/12 701/1 |
| 2020/0298966 A1* | 9/2020 | Arsenault | B60T 13/665 |
| 2021/0354671 A1* | 11/2021 | Cho | B60T 8/34 |

FOREIGN PATENT DOCUMENTS

KR 10-2013-0086440 A 8/2013

* cited by examiner

*Primary Examiner* — John Kwon
(74) *Attorney, Agent, or Firm* — MORGAN, LEWIS & BOCKIUS LLP (57) ABSTRACT

An apparatus for tuning a brake curve based on machine learning includes: a machine learning unit learning a braking tendency based on actual brake data, the braking tendency referring to a deceleration of a vehicle according to a brake operation amount by a driver; and a tuning unit tuning a preset brake curve according to the learned braking tendency, the preset brake curve having deceleration predetermined according to the brake operation amount.

20 Claims, 5 Drawing Sheets

APPARATUS, METHOD, AND COMPUTER READABLE STORAGE MEDIUM FOR TUNING BREAK CURVE BASED ON MACHINE LEARNING

CROSS-REFERENCE TO RELATED APPLICATION(S)

This application claims benefit of priority to Korean Patent Application No. 10-2021-0169183 filed on Nov. 30, 2021 in the Korean Intellectual Property Office, the disclosure of which is incorporated herein by reference in its entirety.

TECHNICAL FIELD

The present disclosure relates to an apparatus, a method, and a computer readable storage medium for tuning a brake curve based on machine learning.

BACKGROUND

A brake curve refers to a deceleration of a vehicle according to a brake operation amount, that is, a pedal effort or a pedal stroke of a brake pedal. Such a brake curve is a factor having an influence on driver brake feeling.

A brake curve of a vehicle according to the related art is linearly determined according to a pedal effort or a pedal stroke of a brake pedal, and is fixed at an early stage of vehicle development. Therefore, it is practically impossible to tune the brake curve so that driver braking tendency or the like is reflected after the vehicles are mass-produced.

SUMMARY

An aspect of the present disclosure may provide an apparatus, a method, and a computer readable storage medium for tuning a brake curve based on machine learning capable of tuning a brake curve so that driver braking tendency is reflected.

According to an aspect of the present disclosure, an apparatus for tuning a brake curve based on machine learning may include: a machine learning unit learning a braking tendency based on actual brake data, the braking tendency referring to a deceleration of a vehicle according to a brake operation amount by a driver; and a tuning unit tuning a preset brake curve according to the learned braking tendency, the preset brake curve having deceleration predetermined according to the brake operation amount.

According to another aspect of the present disclosure, a method for tuning a brake curve based on machine learning may include: learning a braking tendency based on actual brake data by a machine learning unit, the braking tendency referring to a deceleration of a vehicle according to a brake operation amount by a driver; and tuning a preset brake curve according to the learned braking tendency by a tuning unit, the preset brake curve having deceleration predetermined according to the brake operation amount.

According to another aspect of the present disclosure, a computer readable storage medium may record a program for executing the method described above on a computer.

According to another aspect of the present disclosure, an apparatus may include a processor and a non-transitory computer readable storage medium storing instructions that, when executed by the processor, cause the processor to perform: learning a braking tendency based on actual brake data, the braking tendency referring to a deceleration of a vehicle according to a brake operation amount by a driver, and tuning a preset brake curve according to the learned braking tendency, the preset brake curve having deceleration predetermined according to the brake operation amount.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described with reference to the accompanying drawings. However, exemplary embodiments of the present disclosure may be modified into several other forms and the scope of the present disclosure is not limited to exemplary embodiments to be described below. In the drawings, shapes and dimensions of elements may be exaggerated for clarity, and the same components are denoted by the same reference numerals.

Figure 1:
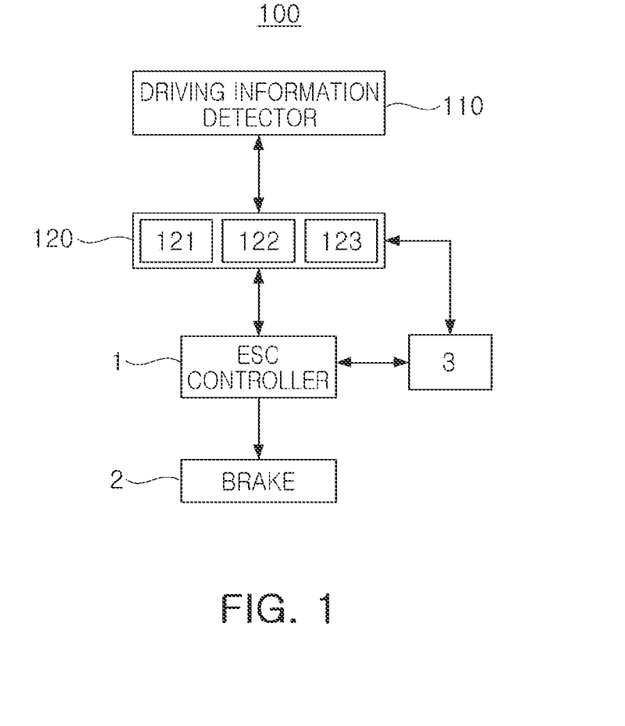
FIG. 1 is a diagram illustrating a configuration of a vehicle including an apparatus for tuning a brake curve according to an exemplary embodiment of the present disclosure.

FIG. 1 is a diagram illustrating a configuration of a vehicle 100 including an apparatus 120 for tuning a brake curve according to an exemplary embodiment of the present disclosure.

As illustrated in FIG. 1, a driving information detector 110 may detect sensing data from various sensors and transmit the detected sensing data to the apparatus 120 for tuning a brake curve. The sensing data may include a pedal effort of a brake pedal detected by a pressure sensor, a pedal stroke detected by a brake pedal position sensor, a brake hydraulic pressure of a cylinder detected by a hydraulic pressure sensor, a deceleration detected by a deceleration sensor, a turning angle of a steering wheel detected by a motor driven power steering (MDPS) sensor, and an acceleration detected by an acceleration sensor.

Meanwhile, the apparatus 120 for tuning a brake curve may include a preprocessing unit 121, a machine learning unit 122, and a tuning unit 123.

Specifically, the preprocessing unit 121 may preprocess the above-described sensing data to generate actual brake data required for machine learning.

The above-described actual brake data may include a pedal effort of the brake pedal, a pedal stroke of the brake pedal, an actual brake time, an actual brake deceleration, an actual brake distance, and driver brake and acceleration tendency.

Here, the pedal effort of the brake pedal and the pedal stroke of the brake pedal may be values received from the above-described driving information detector 110, the actual brake time may be a value obtained by subtracting a start point in time of the formation of the brake hydraulic pressure of the cylinder from an end point in time of the formation of the brake hydraulic pressure of the cylinder, the actual brake deceleration may be obtained by integrating a value obtained by dividing the deceleration detected by the deceleration sensor by the actual brake time, and the actual brake distance may be obtained by integrating the deceleration detected by the deceleration sensor with the actual brake time. In addition, the driver's brake and acceleration tendency may include the number of braking actions during a unit time, whether or not the steering wheel has been turned by a critical value or more at the time of brake, and a time required for a speed of the vehicle to reach a preset speed.

The actual brake data through the pre-processing described above are examples for assisting in the understanding of the present disclosure, and various data for reflecting driver braking tendency may be used.

The machine learning unit 122 may learn the driver braking tendency based on the above-described actual brake data. The driver braking tendency may refer to a deceleration of the vehicle according to a brake operation amount. The above-described actual brake data may be data accumulated until the total number of times of the brake is greater than or equal to the reference number of times, for example, 10,000.

Here, the brake operation amount may be at least one of the pedal effort and the pedal stroke of the brake pedal, the driver braking tendency may include at least one of a deceleration of the vehicle according to the pedal effort of the brake pedal and a deceleration of the vehicle according to the pedal stroke of the brake pedal, and a preset brake curve may include at least one of a first brake curve that is the deceleration of the vehicle according to the pedal effort of the brake pedal, and a second brake curve that is the deceleration of the vehicle according to the pedal stroke of the brake pedal.

The above-described machine learning unit 122 may learn the driver braking tendency using any one of a neural network (NN), a recurrent neural network (RNN), a convolution neural network (CNN), and a long short-term memory network (LSTM), but it is to be noted that a neural network used by the machine learning unit 122 is not limited to the neural networks described above.

Figure 2A:
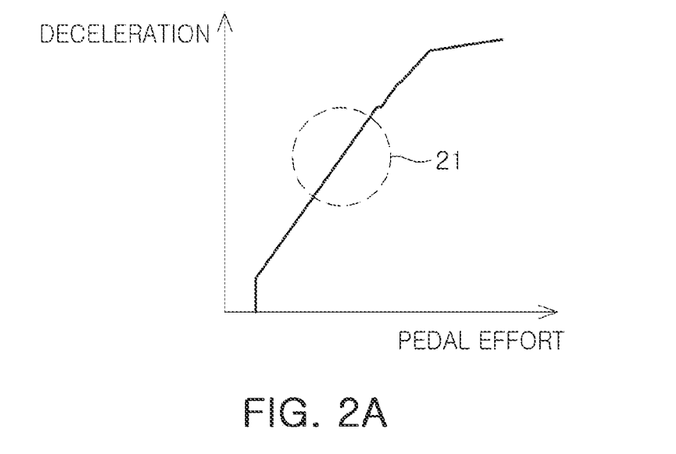
FIGS. 2A and 2B are graphs illustrating a preset brake curve according to an exemplary embodiment of the present disclosure.
Figure 2B:
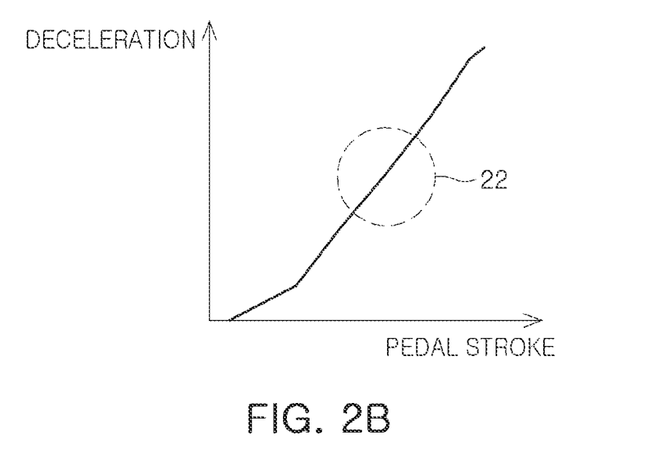

FIGS. 2A and 2B are graphs illustrating a preset brake curve according to an exemplary embodiment of the present disclosure.

The preset brake curve according to an exemplary embodiment of the present disclosure may include a first brake curve that is a deceleration of the vehicle according to the pedal effort of the brake pedal as illustrated in FIG. 2A, and a second brake curve that is the deceleration of the vehicle according to the pedal stroke of the brake pedal as illustrated in FIG. 2B.

The above-described first brake curve and second brake curve may be linearly determined according to the pedal effort and the pedal stroke of the brake pedal, as denoted by reference numerals 21 and 22, respectively.

Meanwhile, the tuning unit 123 may tune the preset brake curve according to the braking tendency learned by the above-described machine learning unit 122. Here, the preset brake curve may have a predetermined deceleration according to a brake operation amount. Hereinafter, a process of tuning a preset brake curve will be described with reference to FIG. 3.

Figure 3A:
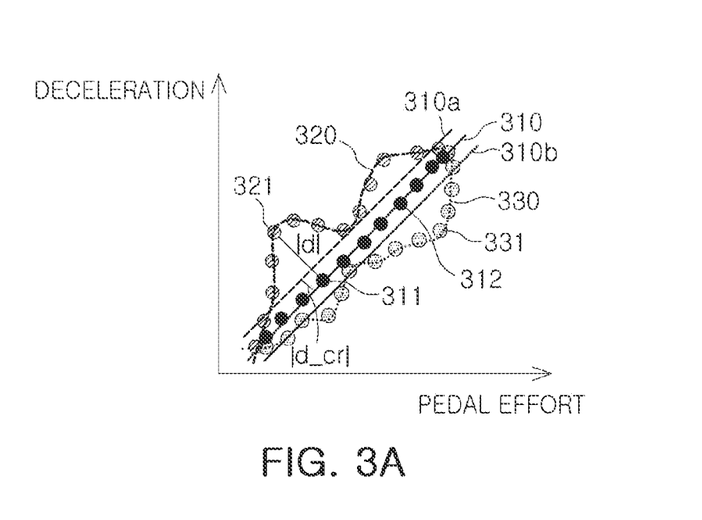
FIGS. 3A and 3B are graphs for describing a process of tuning a preset brake curve according to an exemplary embodiment of the present disclosure.
Figure 3B:
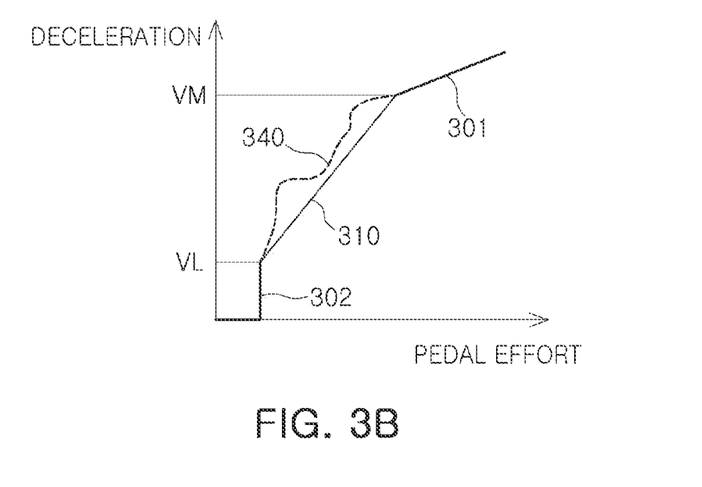

FIGS. 3A and 3B are graphs for describing a process of tuning a preset brake curve according to an exemplary embodiment of the present disclosure. FIG. 3A is a graph for describing a process of tuning a preset brake curve, and FIG. 3B is a graph for comparing the preset brake curve and a tuned brake curve with each other.

First, according to an exemplary embodiment of the present disclosure, the tuning unit 123 may tune a preset brake curve 310 only within the range of a lower limit value VL and an upper limit value VM of a deceleration, as illustrated in FIG. 3B. The tuned brake curve is denoted by reference numeral 340. A section 302 in which the deceleration is the lower limit value VL or less and a section 301 in which the deceleration is the upper limit value VM or more are untunable sections. This is because an anti-lock brake system (ABS) operates with the highest priority in these sections. The above-described lower limit value VL and upper limit value VM may be appropriately set by those skilled in the art if necessary, and thus, are not limited to specific numerical values in the present disclosure.

In addition, according to an exemplary embodiment of the present disclosure, the tuning unit 123 may tune the preset brake curve 310 by increasing a corresponding deceleration 311 on the preset brake curve with respect to a deceleration (e.g., 321) deviating from an upper critical curve 310a among decelerations according to the learned braking tendency 320, as illustrated in FIG. 3A. Here, the above-described upper critical line 310a may be set with respect to a preset brake curve 310. The tuned brake curve is denoted by reference numeral 340 in FIG. 3B.

Meanwhile, the term 'corresponding' used herein may be interpreted as a meaning as follows. That is, when there is a deceleration (e.g., 311) that a perpendicular drawn from the deceleration (e.g., 321) deviating from the upper critical curve 310a to the preset brake curve 310 meets, the deceleration (e.g., 321) deviating from the upper critical curve 310a and the deceleration (e.g., 311) on the preset brake curve 310 may be expressed as 'corresponding to each other'.

Here, when a length |d| from the deceleration 321 according to the learned braking tendency 320 to the corresponding deceleration 311 on the preset brake curve is greater than a critical value |d_cr| of the upper critical curve 310a, it may be determined that the deceleration according to the learned braking tendency 320 deviates from the upper critical curve 310a.

On the other hand, the tuning unit 123 may tune the preset brake curve 310 by decreasing a corresponding deceleration 312 on the preset brake curve with respect to a deceleration (e.g., 331) deviating from a lower critical curve 310b among the decelerations according to the learned braking tendency 320. The above-described lower critical line 310b may be set with respect to a preset brake curve 310. For reference, reference numerals 320 and 330 in FIG. 3A are curves representing different driver braking tendencies.

According to an exemplary embodiment of the present disclosure, the tuning unit 123 may increase or decrease the deceleration in proportion to a magnitude difference between the deceleration deviating from the upper critical curve 310a or the lower critical curve 310b among the decelerations according to the learned braking tendency 320 and the corresponding deceleration on the preset brake curve 310.

Alternatively, according to an exemplary embodiment of the present disclosure, the tuning unit 123 may increase or decrease the deceleration for each section of the deceleration with respect to the deceleration deviating from the upper critical curve 310a or the lower critical curve 310b among the decelerations according to the learned braking tendency 320. For example, the tuning unit 123 may increase or decrease the deceleration to a first predetermined value for a section in which the deceleration is 0.1 g to 0.3 g, a second predetermined value for a section in which the deceleration is 0.3 g to 0.6 g, and a third predetermined value for a section in which the deceleration is 0.6 g to 0.9 g. The first predetermined value, the second predetermined value, and the third predetermined value may be different from each other. In one example, the second predetermined value may be greater than the first predetermined value and less than the third predetermined value.

As illustrated in FIG. 3B, except for the untunable sections 301 and 302, in a case of a driver having the braking tendency as denoted by reference numeral 320 in FIG. 3A, the preset brake curve 310 may be tuned as denoted by reference numeral 340. The tuned brake curve may be stored in a memory 3 illustrated in FIG. 1.

Thereafter, as illustrated in FIG. 1, an electronic stability control (ESC) controller 1 may control a brake 2 according to the tuned brake curve with reference to the memory 3. That is, the deceleration of the vehicle may be adjusted by controlling the brake 2 according to the tuned brake curve, and a specific control algorithm departs from the scope of the present disclosure, and a detailed description thereof is thus omitted.

As described above, according to an exemplary embodiment of the present disclosure, by learning the driver braking tendency based on the actual brake data and turning the preset brake curve according to the learned braking tendency, the brake curve may be tuned so that the driver braking tendency is reflected.

Figure 4:
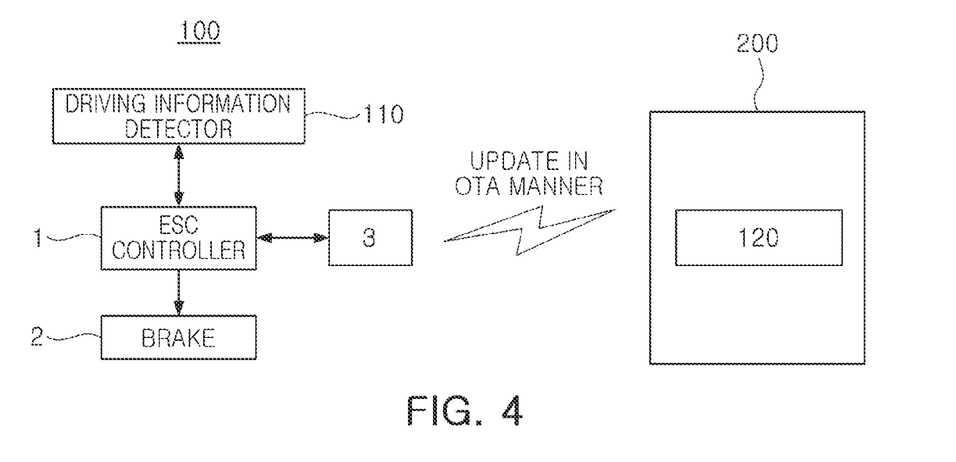
FIG. 4 is a diagram illustrating an update manner when the apparatus for tuning a brake curve according to an exemplary embodiment of the present disclosure is included in an external server.

Meanwhile, FIG. 4 is a diagram illustrating an update manner when the apparatus for tuning a brake curve according to an exemplary embodiment of the present disclosure is included in an external server. FIG. 4 is the same as in FIG. 1 except that the apparatus 120 for tuning a brake curve is included in an external server 200.

Referring to FIG. 4, various sensing data of the driving information detector 110 may be transmitted to the external server 200, and a brake curve tuned by the external server 200 may be updated in an over-the-air (OTA) manner. The OTA manner is one of the update manners, and is a technology for wirelessly performing update using Wireless Fidelity (WiFi) or the like without connecting a computer.

Figure 5:
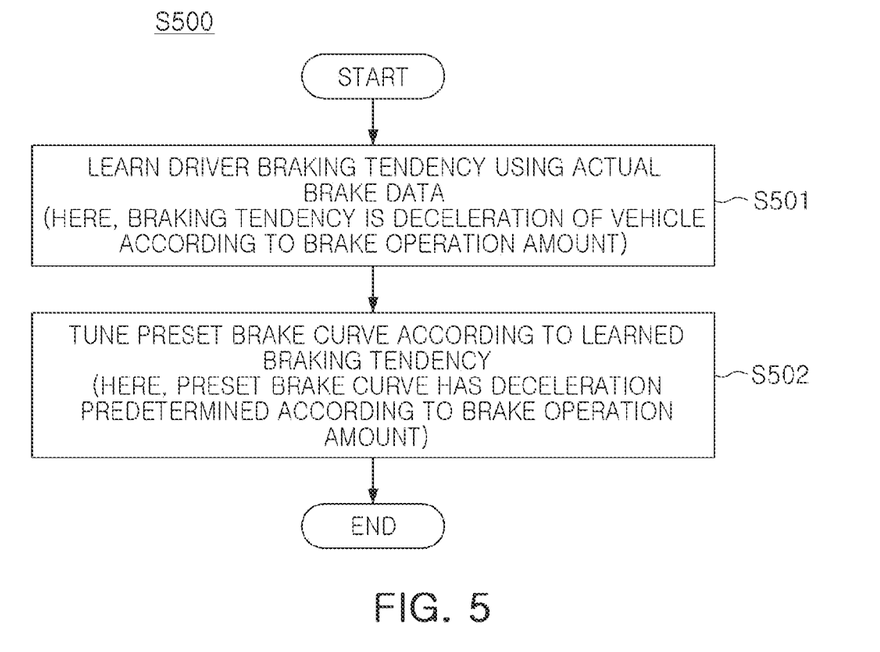
FIG. 5 is a flowchart for describing a method for tuning a brake curve according to an exemplary embodiment of the present disclosure.

Meanwhile, FIG. 5 is a flowchart for describing a method for tuning a brake curve according to an exemplary embodiment of the present disclosure.

A method (S500) for tuning a brake curve according to an exemplary embodiment of the present disclosure will hereinafter be described with reference to FIGS. 1 to 5. However, a description of contents overlapping those described with reference to FIGS. 1 to 4 will be omitted for simplification of the disclosure.

First, referring to FIGS. 1 to 5, the method (S500) for tuning a brake curve according to an exemplary embodiment of the present disclosure may start by learning the driver braking tendency based on the actual brake data in the machine learning unit 122 (S501). The above-described braking tendency may refer to a deceleration of the vehicle according to a brake operation amount. As described above, the actual brake data may be data accumulated until the total number of times of the brake is greater than or equal to the reference number of times, for example, 10,000.

According to an exemplary embodiment of the present disclosure, as described above, the brake operation amount may be at least one of the pedal effort and the pedal stroke of the brake pedal, the driver braking tendency may include at least one of a deceleration of the vehicle according to the pedal effort of the brake pedal and a deceleration of the vehicle according to the pedal stroke of the brake pedal, and a preset brake curve may include at least one of a first brake curve that is the deceleration of the vehicle according to the pedal effort of the brake pedal, and a second brake curve that is the deceleration of the vehicle according to the pedal stroke of the brake pedal.

According to an exemplary embodiment of the present disclosure, as described above, the actual brake data may include a pedal effort of the brake pedal, a pedal stroke of the brake pedal, an actual brake time, an actual brake deceleration, an actual brake distance, and driver brake and acceleration tendency.

According to an exemplary embodiment of the present disclosure, as described above, the machine learning unit 122 may learn the driver braking tendency using any one of a neural network (NN), a recurrent neural network (RNN), a convolution neural network (CNN), and a long short-term memory network (LSTM).

Next, the tuning unit 123 may tune the preset brake curve according to the learned braking tendency (here, the preset brake curve may have a predetermined deceleration according to a brake operation amount) (S502).

According to an exemplary embodiment of the present disclosure, as described above, the tuning unit 123 may tune the preset brake curve 310 only within the range of the lower limit value VL and the upper limit value VM of a deceleration.

In addition, according to an exemplary embodiment of the present disclosure, as described above, the tuning unit 123 may tune the preset brake curve 310 by increasing the corresponding deceleration 311 on the preset brake curve with respect to the deceleration (e.g., 321) deviating from the upper critical curve 310a among the decelerations according to the learned braking tendency 320.

In addition, according to an exemplary embodiment of the present disclosure, the tuning unit 123 may tune the preset brake curve 310 by decreasing the corresponding deceleration 312 on the preset brake curve with respect to the deceleration (e.g., 331) deviating from the lower critical curve 310b among the decelerations according to the learned braking tendency 320.

According to an exemplary embodiment of the present disclosure, as described above, the tuning unit 123 may increase or decrease the deceleration in proportion to the magnitude difference between the deceleration deviating from the upper critical curve 310a or the lower critical curve 310b set with respect to the preset brake curve 310 among the decelerations according to the learned braking tendency 320 and the corresponding deceleration on the preset brake curve 310.

Alternatively, according to an exemplary embodiment of the present disclosure, as described above, the tuning unit 123 may increase or decrease the deceleration for each section of the deceleration with respect to the deceleration deviating from the upper critical curve 310a or the lower critical curve 310b among the decelerations according to the learned braking tendency 320.

As described above, according to an exemplary embodiment of the present disclosure, by learning the driver braking tendency based on the actual brake data and turning the preset brake curve according to the learned braking tendency, the brake curve may be tuned so that the driver braking tendency is reflected.

Figure 6:
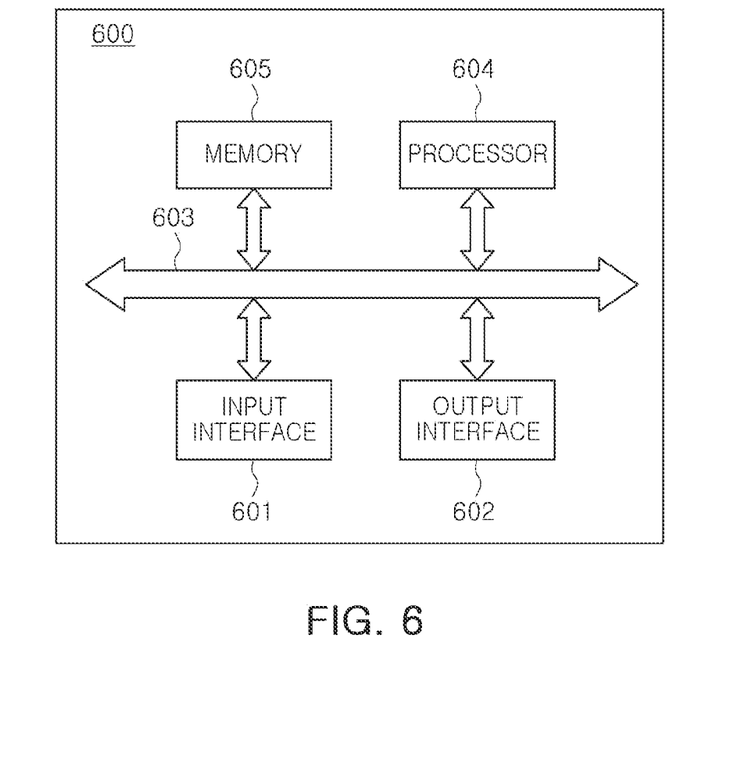
FIG. 6 is a block diagram of a computer apparatus capable of implementing the apparatus for tuning a brake curve according to an exemplary embodiment of the present disclosure.

Meanwhile, FIG. 6 is a block diagram of a computer apparatus capable of implementing the apparatus for tuning a brake curve according to an exemplary embodiment of the present disclosure, and such a computer apparatus may be applied to the apparatus 120 for tuning a brake curve illustrated in FIG. 1.

As illustrated in FIG. 6, a computer device 600 may include an input interface 601, an output interface 602, a processor 604, and a memory 605. The input interface 601, the output interface 602, the processor 604, and the memory 605 may be connected to each other via a system bus 603.

In an exemplary embodiment of the present disclosure, the memory 605 may be used to store programs, instructions, or codes, and the processor 604 may execute the programs, the instructions, or the codes stored in the memory 605, control the input interface 601 to receive signals in a wired or wireless manner, and control the output interface 602 to transmit signals in a wired or wireless manner. The above-described memory 605 may include a read-only memory and a random access memory, and may provide instructions and data to the processor 604.

In an exemplary embodiment of the present disclosure, it is to be noted that the processor 604 may be a central processing unit (CPU), and may be another general-purpose processor, a digital signal processor (DSP), an application specific integrated circuit (ASIC), a field programmable gate array (FPGA) or other programmable logic device, an individual gate or transistor logic device, an individual hardware component, or the like. A general-purpose processor may be a microprocessor, or may be any processor according to the related art, or the like. The above-described processor 604 may perform an operation of the apparatus for tuning a brake curve described above.

In one implementation process, the method for tuning a brake curve illustrated in FIG. 5 may be achieved by an integrated logic circuit of hardware in the processor 604 or an instruction in the form of software. Contents of a method disclosed in relation to an exemplary embodiment of the present disclosure may be implemented to be performed and completed by a hardware processor or be performed and completed by a combination of hardware and software modules of the processor. The software module may be disposed in a non-transitory computer readable storage medium such as a random access memory, a flash memory, a read-only memory, a programmable read-only memory or an electrically erasable programmable memory, or a register. The storage medium is positioned in the memory 605, and the processor 604 reads information from the memory 605, and implements the contents of the method described above in combination with hardware. In order to avoid an overlapping description, a detailed description is omitted herein.

In one example, the preprocessing unit 121, the machine learning unit 122, and the tuning unit 123 may be implemented as one or more processors such as the processor 604. The operations described with reference to the preprocessing unit 121, the machine learning unit 122, and the tuning unit 123 may be implemented as programs, instructions, or codes stored in a non-transitory computer readable storage medium such as the memory 605. When the programs, instructions, or codes stored in the non-transitory computer readable storage medium are executed by the one or more processors, the one or more processors may be configured to perform the corresponding operations described with reference to the preprocessing unit 121, the machine learning unit 122, and the tuning unit 123.

As set forth above, according to an exemplary embodiment of the present disclosure, by learning the driver braking tendency based on the actual brake data and turning the preset brake curve according to the learned braking tendency, the brake curve may be tuned so that the driver braking tendency is reflected.

The present disclosure is not limited by the above-described exemplary embodiments and the accompanying drawings. The scope of the present disclosure is to be limited by the claims, and it will be obvious to those skilled in the art that various substitutions, modifications, and alterations may be made without departing from the technical spirit of the present disclosure described in the claims.

What is claimed is:

1. An apparatus for tuning a brake curve based on machine learning, comprising:
a machine learning unit learning a braking tendency based on actual brake data, the braking tendency referring to a deceleration of a vehicle according to a brake operation amount by a driver; and
a tuning unit tuning a preset brake curve according to the learned braking tendency, the preset brake curve having deceleration predetermined according to the brake operation amount.

2. The apparatus of claim 1, wherein the brake operation amount is at least one of a pedal effort and a pedal stroke of a brake pedal,
the braking tendency includes at least one of a deceleration of the vehicle according to the pedal effort of the brake pedal and a deceleration of the vehicle according to the pedal stroke of the brake pedal, and
the preset brake curve includes at least one of a first brake curve that is the deceleration of the vehicle according to the pedal effort of the brake pedal and a second brake curve that is the deceleration of the vehicle according to the pedal stroke of the brake pedal.

3. The apparatus of claim 1, wherein the tuning unit tunes the preset brake curve within a range of a lower limit value and an upper limit value of the deceleration.

4. The apparatus of claim 1, wherein the tuning unit increases or decreases a corresponding deceleration on the preset brake curve with respect to a deceleration deviating from an upper critical curve or a lower critical curve set with respect to the preset brake curve among decelerations according to the learned braking tendency.

5. The apparatus of claim 4, wherein the tuning unit increases or decreases the deceleration in proportion to a magnitude difference between the deceleration deviating from the upper critical curve or the lower critical curve set with respect to the preset brake curve among the decelerations according to the learned braking tendency and the corresponding deceleration on the preset brake curve.

6. The apparatus of claim 4, wherein the tuning unit increases or decreases the deceleration for each section of the deceleration with respect to the deceleration deviating from the upper critical curve or the lower critical curve set with respect to the preset brake curve among the decelerations according to the learned braking tendency.

7. The apparatus of claim 1, wherein the machine learning unit learns the braking tendency using one of a neural network (NN), a recurrent neural network (RNN), a convolution neural network (CNN), and a long short-term memory network (LSTM).

8. The apparatus of claim 1, wherein the actual brake data includes a pedal effort of a brake pedal, a pedal stroke of the brake pedal, an actual brake deceleration, an actual brake distance, an actual brake time, and driver brake and acceleration tendency including the number of braking actions during a unit time, whether or not a steering wheel has been turned by a critical value or more at the time of brake, and a time required for a speed of the vehicle to reach a preset speed.

9. The apparatus of claim 1, wherein the apparatus is included in the vehicle.

10. The apparatus of claim 1, wherein the apparatus is included in an external server.

11. A method for tuning a brake curve based on machine learning, comprising:
  learning a braking tendency based on actual brake data by a machine learning unit, the braking tendency referring to a deceleration of a vehicle according to a brake operation amount by a driver; and
  tuning a preset brake curve according to the learned braking tendency by a tuning unit, the preset brake curve having deceleration predetermined according to the brake operation amount.

12. The method of claim 11, wherein the brake operation amount is at least one of a pedal effort and a pedal stroke of a brake pedal,
  the braking tendency includes at least one of a deceleration of the vehicle according to the pedal effort of the brake pedal and a deceleration of the vehicle according to the pedal stroke of the brake pedal, and
  the preset brake curve includes at least one of a first brake curve that is the deceleration of the vehicle according to the pedal effort of the brake pedal and a second brake curve that is the deceleration of the vehicle according to the pedal stroke of the brake pedal.

13. The method of claim 11, wherein the tuning of the preset brake curve includes tuning the preset brake curve within a range of a lower limit value and an upper limit value of the deceleration.

14. The method of claim 11, wherein the tuning of the preset brake curve includes increasing or decreasing a corresponding deceleration on the preset brake curve with respect to a deceleration deviating from an upper critical curve or a lower critical curve set with respect to the preset brake curve among decelerations according to the learned braking tendency.

15. The method of claim 14, wherein the tuning of the preset brake curve includes increasing or decreasing the deceleration in proportion to a magnitude difference between the deceleration deviating from the upper critical curve or the lower critical curve set with respect to the preset brake curve among the decelerations according to the learned braking tendency and the corresponding deceleration on the preset brake curve.

16. The method of claim 14, wherein the tuning of the preset brake curve includes increasing or decreasing the deceleration for each section of the deceleration with respect to the deceleration deviating from the upper critical curve or the lower critical curve set with respect to the preset brake curve among the decelerations according to the learned braking tendency.

17. The method of claim 11, wherein in the learning of the braking tendency, the braking tendency is learned using one of a neural network (NN), a recurrent neural network (RNN), a convolution neural network (CNN), and a long short-term memory network (LSTM).

18. The method of claim 11, wherein the actual brake data includes a pedal effort of a brake pedal, a pedal stroke of the brake pedal, an actual brake deceleration, an actual brake distance, an actual brake time, and driver brake and acceleration tendency including the number of braking actions during a unit time, whether or not a steering wheel has been turned by a critical value or more at the time of brake, and a time required for a speed of the vehicle to reach a preset speed.

19. A non-transitory computer readable storage medium recording a program for executing the method of claim 11 on a computer.

20. An apparatus comprising:
  a processor; and
  a non-transitory computer readable storage medium storing instructions that, when executed by the processor, cause the processor to perform:
    learning a braking tendency based on actual brake data, the braking tendency referring to a deceleration of a vehicle according to a brake operation amount by a driver, and
    tuning a preset brake curve according to the learned braking tendency, the preset brake curve having deceleration predetermined according to the brake operation amount.

* * * * *